(12) United States Patent
Mikkola

(10) Patent No.: US 7,782,875 B2
(45) Date of Patent: Aug. 24, 2010

(54) MEGACO PROTOCOL WITH GROUP TERMINATION

(75) Inventor: Olli Mikkola, Klaukkala (FI)

(73) Assignee: Nokia Corporation, Espoo (FI)

( * ) Notice: Subject to any disclaimer, the term of this patent is extended or adjusted under 35 U.S.C. 154(b) by 2258 days.

(21) Appl. No.: 10/173,558

(22) Filed: Jun. 18, 2002

(65) Prior Publication Data

US 2003/0231639 A1    Dec. 18, 2003

(51) Int. Cl.
*H04L 12/28* (2006.01)
(52) U.S. Cl. ...................................................... 370/400
(58) Field of Classification Search .................. None
See application file for complete search history.

(56) References Cited

U.S. PATENT DOCUMENTS

| | | | |
|---|---|---|---|
| 6,141,347 A | 10/2000 | Derango et al. | |
| 6,529,882 B1 * | 3/2003 | Park et al. | 705/51 |
| 6,888,839 B1 * | 5/2005 | Scoggins et al. | 370/410 |
| 7,386,000 B2 | 6/2008 | Lopponen et al. | 370/433 |
| 2003/0009337 A1 * | 1/2003 | Rupsis | 704/260 |

OTHER PUBLICATIONS

Megaco/H.248 specification version 1.0, Nov. 2000.*
C. Groves et al., "The Megaco/H.248 Gateway Control Protocol, version 2," The Media Gateway Control, p. 1-75, (Apr. 2003).
"Lightweight Director Access Protocol (v3)", M. Wahl, et al., RFC 2251, Dec. 1997, 50 pgs.
"Megaco Protocol Version 1.0", F. Cuervo et al., RFC 3015, Nov. 2000, 179 pgs.

* cited by examiner

*Primary Examiner*—Raj Jain
(74) *Attorney, Agent, or Firm*—Harrington & Smith

(57) ABSTRACT

Megaco is a device control protocol defining a general framework for physically decomposed media gateway, where the intelligence of the gateway is in a master node called the media gateway controller, and the actual switching and media transfer is performed in one or more slave nodes called the media gateway(s). In order to enable transfer of group-related information from the media gateway controller to the media gateway, a group termination for the group-related information is created in the media gateway. The group termination is non-member-specific and associated with the group, and the media streams to the group are directed to the group termination.

23 Claims, 3 Drawing Sheets

MEGACO PROTOCOL WITH GROUP TERMINATION

FIELD OF THE INVENTION

The invention relates to a Megaco protocol used between a media gateway (MG) and an external controller, called a media gateway controller (MGC), and particularly to implementing voice telephony using IP (Internet Protocol) called VoIP (voice over IP) in situations, where terminals are connected to a service utilizing the VoIP via a low capacity IP packet data network.

BACKGROUND OF THE INVENTION

Megaco (defined identically in IETF RFC3015 and ITU-T H.248) is a device control protocol assigning data stream resources between decomposed user and control planes in telecommunications/data systems. In other words, the Megaco defines a general framework for a physically decomposed media gateway, where the intelligence of the gateway is in a master node called the media gateway controller (MGC) and the actual switching and media transfer are performed in one or more slave nodes called the media gateway(s) or multimedia gateway(s). Herein the term media gateway is used. Megaco is used between the media gateway and the MGC for resource reservations, connection settings, media transformation settings, signal/event indications and processing, quality of service (QoS) settings, sending statistics information and signaling control.

The Megaco can be used, for example, in situations where a professional mobile radio or a private mobile radio (PMR) system uses VoIP connections. Professional mobile radio or private mobile radio (PMR) systems are dedicated radio systems developed primarily for professional and governmental users, such as the police, military forces, oil plants, etc. PMR services have been offered via dedicated PMR networks built with dedicated PMR technologies. This market is divided between several technologies—analog, digital, conventional and trunked—none of which has a dominating role. TETRA (Terrestrial Trunked Radio) is a standard defined by ETSI (European Telecommunications Standards Institute) for digital PMR systems. U.S. Pat. No. 6,141,347 discloses a wireless communications system which uses multicast addressing and decentralized processing in group calls.

One special feature offered by the PMR systems is group communication. The term "group", as used herein, refers to any logical group of three or more users intended to participate in the same group communication, e.g. call. The groups are created logically, i.e. special group communication information maintained on the network side associates specific user with a particular group communication group. This association can be readily created, modified or canceled. The same user may be a member in more than one group communication group. Typically, the members of the group communication group belong to the same organization, such as the police, the fire brigade, a private company, etc. Also, typically, the same organization has several separate groups, i.e. a set of groups.

Voice traffic in a group, as seen by the users, consists of speech items (i.e. talkspurts) of more or less continuous speech coming from a specific user to one or more recipients. In the following speech items are used to illustrate items of all possible media streams.

A group call typically has a long duration (up to days) during which communication takes place quite infrequently and each interaction is typically short. The total active traffic may be, for example, only 15 minutes during a call. Each talk burst or speech item has an average length of 7 seconds in the existing PMR systems. Therefore, the radio channels or other expensive system resources cannot be allocated all the time, because the service becomes much too expensive. Group communication with a push-to-talk feature is one of the essential features of any PMR network overcoming this problem. Generally, in group voice communication with a "push-to-talk, release-to-listen" feature, a group call is based on the use of a pressel (PTT, push-to-talk switch) in a telephone as a switch: by pressing a PTT the user indicates his desire to speak, and the user equipment sends a service request to the network. The network either rejects the request or allocates the requested resources on the basis of predetermined criteria, such as the availability of resources, priority of the requesting user, etc. At the same time, a connection is established also to all other active users in the specific subscriber group. After the voice connection has been established, the requesting user can talk and the other users listen on the channel. When the user releases the PTT, the user equipment signals a release message to the network, and the resources are released. Thus, the resources are reserved only for the actual speech transaction or speech item.

One of the requirements for group communications in communications systems is that group communication requires traffic discipline: one talks and the others listen. Therefore the radio interface is of a semi-duplex type. Only one direction is active at a time. The communications system must be able to control that only one member speaks at a time in a group.

A problem with the semi-duplex group VoIP service provided by the Megaco is that there is no mechanism to transfer some common intelligence of the group from the media gateway controller to the media gateway. This requires continuous message exchange between the MGC and the media gateway thus causing delays and network load. For example, in order to decide which one of the users is allowed to speak at a time, the media gateway must ask the media gateway controller which one of the users is the allowed one every time the speaking turn changes

BRIEF DESCRIPTION OF THE INVENTION

An object of the present invention is thus to provide a method and an apparatus for implementing the method so as to solve the above problem. The objects of the invention are achieved by a method and an arrangement which are characterized by what is stated in the independent claims. The preferred embodiments of the invention are disclosed in the dependent claims.

The invention is based on the idea of transferring intelligence to the media gateway by creating for each group a group termination associated with the group and not relating to any specific member of the group and directing all incoming group traffic to the group termination. Since the group termination is non-member-specific, part of the intelligence in the media gateway controller can be transferred to the group termination and applied to all media streams of the group. The transferred intelligence may relate to a rule or rules which indicate at least which user is allowed to transmit (e.g. speak). The intelligence may also relate to a rule or rules, which indicate those members who will receive the transmission (e.g hear the speaker). A rule is formed by a parameter with its value or by different parameters and their values.

An advantage of the invention is that it provides means to transfer some intelligence to the media gateway so that it can independently perform functions without requesting instructions from the MGC. Thus unnecessary load and delays are avoided and yet the media gateway is maintained rather simple and the main intelligence and control is maintained in the MGC. For example, by means of the group termination the media gateway can independently control which one of the users, i.e. members of the group, is allowed to talk without requesting instructions from the MGC.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
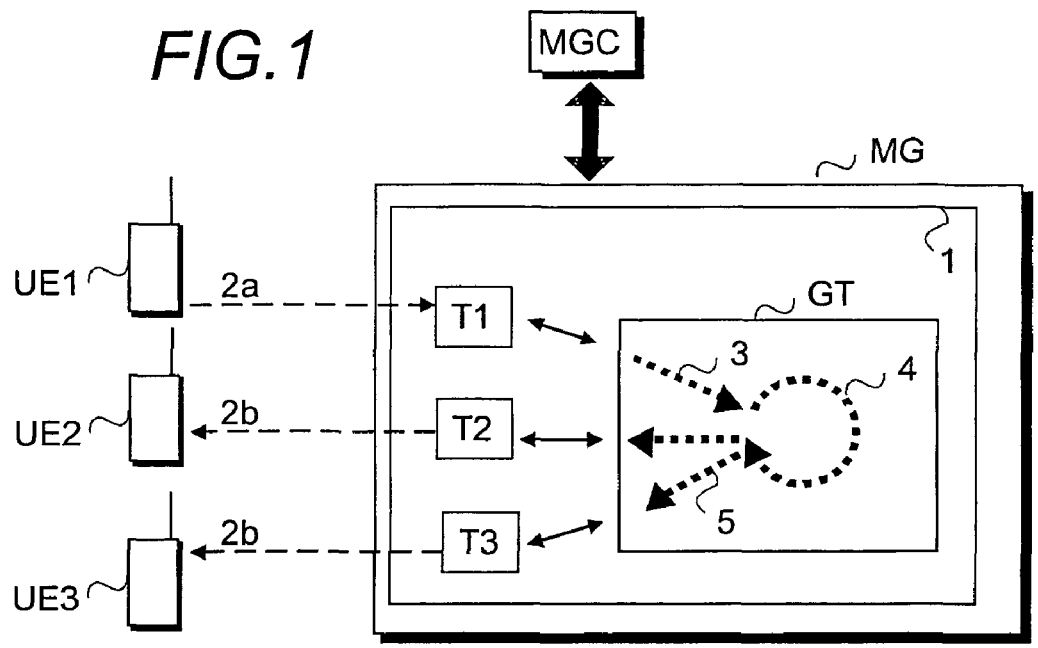
FIG. 1 illustrates a connection model of the Megaco according to the invention showing one example of how a group call is handled.

FIG. 1 illustrates the connection model of the Megaco protocol according to the invention and the basic elements in an environment where Megaco may be used. As stated earlier, the Megaco defines a general framework for a physically decomposed media gateway MG, where the intelligence of the gateway is in a master node called the media gateway controller MGC and the actual switching and media transfer are performed in one or more slave nodes called the media gateway(s) MG. Megaco (thick line) is used between the media gateway MG and the media gateway controller MGC for resource reservations, connection settings, media transformation settings, signal/event indications and processing, quality of service (QoS) settings, sending statistics information and signaling control. Thus, Megaco is a set of those messages that are used to control the MG. The basic Megaco protocol supports several different circuit and packet bearer types, such as TDM (time-division multiplexing) and ATM (asynchronous transfer mode), for example. The Megaco protocol employs the underlying TCP, UDP and IP protocols which further employ the physical layer resources.

The media gateway controller MGC is the part of the gateway which commands the media gateway to connect and release the connections. In other words, the MGC performs the control plane functions and comprises the intelligence. The media gateway controller may, for example, be controlled by a so-called soft switch or a SIP (Session Inititiation Protocol) proxy via which the actual signaling is routed, be part of the soft switch or the SIP proxy, or it may be a network node via which the signaling is routed. Depending on how the MGC is implemented, it may be involved in signaling and it may co-operate with other signaling protocols, such as SIP or it can receive control information with some protocol, such as Parlay API or SOAP (Simple Object Access Protocol, defined by the World Wide Web Consortium W3C). The media gateway controller according to the invention is described in more detail below with the connection model and with FIGS. 3 to 6. One media gateway controller controls one or more media gateways.

The media gateway MG converts media provided in one type of network to the format required in another type of network, e.g. between circuit switched networks and IP-based packet networks and is involved in traffic distribution of the IP layer, i.e. performs the user plane functions. The media gateway according to the invention is described in more detail below with the connection model and with FIGS. 2 to 7.

The user equipment UE, i.e. the terminal, is normally a phone, either a mobile phone or a fixed phone, but it can be any entity connected to a network. In this context, the user equipment UE generally refers to a combination of an actual terminal and a user of the terminal, i.e. with mobile phones, a combination of a mobile unit and a mobile subscriber, which is identified in the system by e.g. a SIM (Subscriber Identity Module) card detachably coupled to the mobile unit or by requesting username and password, for example. In addition to the term 'user', the term 'member' is also used.

Connection Model of the Megaco

For the sake of clarity the connection model of FIG. 1 describes the logical entities within the media gateway that can be controlled by the MGC and that relates only to one group.

The main abstractions are terminations T1, T2, T3, and context 1. A termination is a logical entity that sources and/or sinks one or more media streams. The media stream parameters and bearer parameters are encapsulated within the termination. The termination can be considered as a call resource or a call leg. Examples of prior art terminations are PCM (pulse code modulation) timeslot for speech, RTP (real-time transport protocol) connection, ATM virtual connection. A context is an association between a collection of terminations that describes the topology (who hears/sees whom) and the media mixing and/or switching parameters if more than two terminations are involved in the same association. The context can be considered as a call or a session, and it may comprise several terminations. The maximum number of terminations in a context is a media-gateway-specific property. Media gateways that support only point-to-point connectivity may allow at most two terminations per one context. Media gateways that support multipoint conferences or group calls may allow three or more terminations per one context.

Priority values can be used by the MGC in order to provide the MG with information about certain precedence handling for a context, and an indicator for an emergency call is also provided to allow preference handling. The protocol provides commands for manipulating the logical entities of its connection model, contexts and terminations. Typical commands are add (adds a termination to a context), modify (modifies the properties of a termination), subtract (removes termination from a context) and notify (the media gateway notifies the MGC about certain events, such as off-hook, DTMF tone detection).

Megaco protocol provides packages with which properties not included in the base protocol can be defined so that the interoperability between the media gateway controller and the media gateway is achieved. Packages allow terminations to have optional properties, events, signals and statistics implemented by the media gateway. Such options are grouped in packages, and a termination realizes a set of such packages.

The Megaco connection model according to the invention comprises for each group a group context 1 comprising a group termination GT. In the examples illustrated in FIGS. 1 and 2 there is, in each group context, only one group termination GT for the group, and a prior art termination T1, T2, T3 for each active member of the group, but the invention is not limited to this particular solution. In some other embodiments of the invention there may also be other kinds of terminations within the context and/or no prior art terminations. The intelligence is transferred from the media gateway controller to the user termination by sending parameters and their values in Megaco messages, as described in detail below with FIGS. 4 and 5. The parameters and their values define the rules which are to be applied to the media streams of the group. The term 'parameter' covers here also an indication identifying the parameter whose value is sent.

The GT can be created in response to the first member joining the group or when an operator, for example, provisions a group. In the latter case the GT exists even when there are no members, whereas in the first case the GT may be deleted in response to the last member leaving the group.

The GT contains as a parameter preferably at least some identification information which can be used for charging purposes.

The GT may also contain inband information insertion parameter/s which define what is responded to the one trying to talk. For example, inband information may be some indication that the user is not allowed to speak. In embodiments where the GT maintains a waiting list for speakers willing to speak but not yet allowed, inband information might state the queue number of the member or that the member will have the forthcoming speaking turn etc. Inband information may also state that the speech was interrupted by a higher priority member or that the maximum time of the speaking turn is encountered in x seconds, for example.

The GT may also contain multiplication parameter/s which define to which members of the group the speak item is sent (i.e. multiplied). For example, information on whether or not the speak item is multiplied also to the speaker.

The GT may also contain other controlling parameters, such as media stream management timer values or assignment of speaking turns, so that the willingness to talk is taken into account (with or without a waiting list). One media stream timer is a talkspurt maximum timer, which restricts the time a speaker can speak without interruption. In other words, at the expiry of the talkspurt maximum timer the talkspurt of the speaker is stopped, even when there is no other speaker. To be able to speak again he will need to release the PTT and push it again.

When the GT is created and parameters are passed to and/or modified in (during the creation or after the creation) the media gateway, the media gateway may independently, i.e. without requesting instructions from the media gateway controller, decide which one of the active members is allowed to speak. In prior art solutions (where there is no GT) each time when the speaker changes, the MGC has to change the topology again by sending a Megaco message and in order to decide who can talk, the media gateway has to continuously inform the MGC about the incoming media streams from terminations T1, T2, T3. All this information change is avoided by the group termination in the media gateway.

The GT according to the invention is preferably defined by using a set of Megaco protocol packages, at least as long as it is not included in the base protocol.

It should be noted that when a prior art termination T1, T2, T3 or the like is added to the context comprising the GT, the topology settings should indicate that a both-way connection is formed between the new termination and the GT, but not between the new termination and existing prior art terminations. In other words, the topology should be as illustrated in FIGS. 1 and 2.

Basic Performance of the Group Termination

Figure 2:
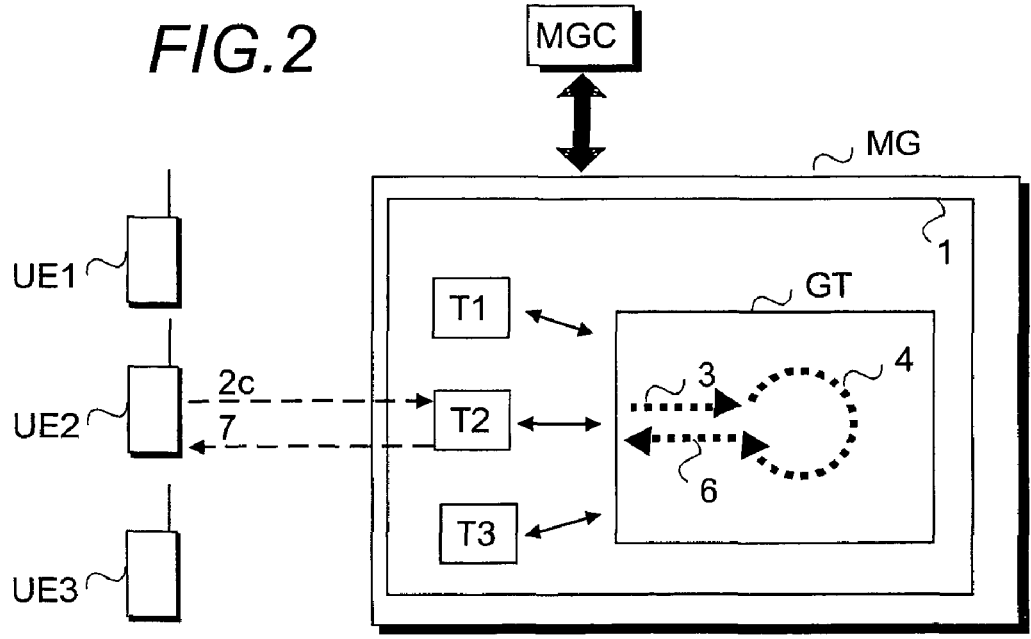
FIG. 2 shows another example of how a group call is handled.

The basic performance of the group termination according to the invention is described in FIGS. 1 and 2. The dashed lines in FIGS. 1 and 2 represent the flow of media streams, the unbroken lines represent the Megaco connection model between terminations inside a context, and the dotted line represents logical connections inside the group termination.

In the example of FIGS. 1 and 2, there are three active members in the group, and the user UE1 is the one who is allowed to speak.

Referring to FIG. 1, when the user UE1 sends a media stream 2a, such as a speech item, it is directed via user's termination T1 to a receiving process 3 of the group termination GT. Then the GT performs a checking procedure 4 according to its parameter settings. In other words, the GT checks whether the user UE1 is allowed to speak. Since in the illustrated example the user UE1 is allowed to speak, GT performs a multiplication process 5, i.e. multiplies the media stream to other active members, i.e. the users UE2 and UE3. In other words, in VoIP systems, it multiplies the speech items or corresponding items (i.e. packets). The media stream 2b is sent from the corresponding terminations T2, T3 to the users UE2, UE3 correspondingly. In some other embodiment of the invention, the media stream may be sent back to the speaker as well. In that case also the speaker hears what he says.

Referring to FIG. 2, when the user UE2 sends a media stream 2c, such as a speech item, it is directed via user's termination T2 to the group termination GT. Then the GT performs the checking procedure 4 according to its parameter settings. In other words, the GT checks whether the user UE2 is allowed to speak. Since in the illustrated example the user UE1 is allowed to speak, and not the user UE2, the GT does not allow the user UE2 to speak. His media stream is neither multiplied nor forwarded. Instead, in the exemplary embodiment of the invention, the GT performs a generating procedure 6 generating inband information indicating that the user UE2 is not allowed to speak. A media stream 7 containing the inband information is sent from T2 to the user UE2. In some other embodiment of the invention, no inband information is generated or sent. In another embodiment of the invention the GT collects information on speakers who wanted to speak but were not allowed to speak and uses the collected information when deciding who is the next speaker.

In other words, the GT decides whether or not to forward the speech item and to whom to multiply it. The GT makes the decision according to rules defined by one or more parameters and their values, the parameters relating to the priorities of the active members, timer values defining how long a member can speak at a time, for example. Each of the parameters may have a member-specific value or a group-specific value even within one group termination.

PMRoC

The present invention is applicable to any digital communications systems which utilize the Megaco protocol. The invention is especially preferably applicable to communications systems disclosed in U.S. patent application Ser. No. 09/835,867, the system being called PMRoC, i.e. PMR-over-cellular, where Megaco is used by control plane elements to control RTP routing in user plane elements in systems. The system is also called PoC, i.e. Push-to-talk over Cellular. In the following, the preferred embodiment of the invention will be described by means of the above-mentioned system without limiting the invention to this particular system. The IP voice communication method used in the exemplary embodiment of the invention is the Voice over IP (VoIP), but the invention is not limited to this particular method. The features disclosed in U.S. patent application Ser. No. 09/835,867 and needed to understand the implementation of the present invention are discussed briefly below with FIGS. 3 and 4. The specifications of different communication systems evolve rapidly. This evolution may require extra changes to the invention. Therefore, all terms and expressions should be interpreted as widely as possible and they are intended to describe and not to limit the invention.

Figure 3:
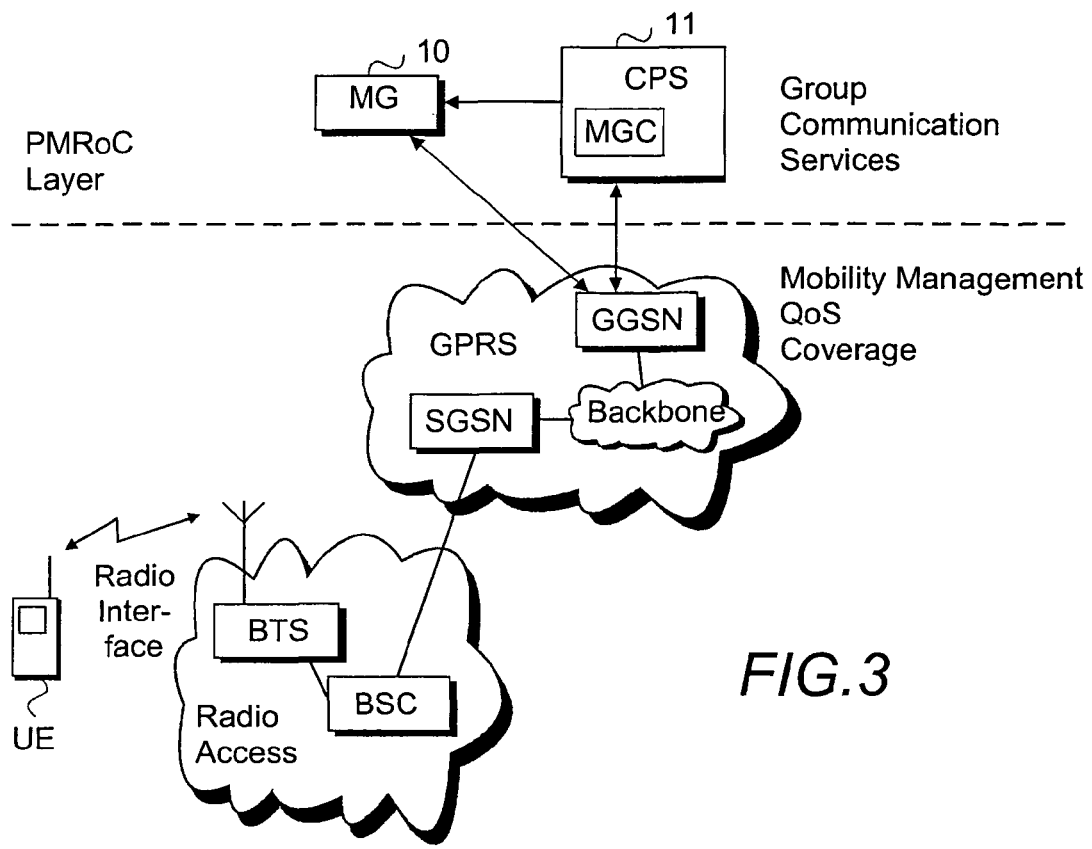
FIGS. 3 and 4 illustrate the basic architecture of a PMRoC-system utilizing the Megaco.

FIG. 3 illustrates the basic architecture in the exemplary embodiment of the invention which is based on the PMR. In the illustrated embodiment, a mobile radio access network (RAN) which provides the IP packet data service is based on a GPRS architecture utilizing a 2G radio access technology, such as a GSM base station system BSS with base stations BTS and base station controllers BSC. The GSM radio access may be conventional or based on the GSM EDGE technique. In the latter case, radio access may be referred to as GERAN which is an all-IP GSM radio access network. Alternatively, a 3G radio access network UTRAN (such as UMTS) may be used. An all-IP core network can be used both in GERAN and UTRAN. The architecture of the mobile network is not essential to the invention, but the GPRS infrastructure and operation will be briefly discussed in order to make it easier to comprehend the PMRoC. The GPRS infrastructure comprises support nodes, such as a GPRS gateway support node (GGSN) and a GPRS serving support node (SGSN). The main functions of the SGSN are to detect new GPRS mobile stations in its service area, handle the process of registering new user equipments UE (also called mobile stations MS) along with the GPRS registers, send/receive data packets to/from the UE, and keep a record of the location of the UEs inside of its service area. The subscription information is stored in a GPRS register (HSS, Home Subscriber Server). The main functions of the GGSN nodes involve interaction with external data networks. The GGSN may also be connected directly to a private corporate network or a host. The GGSN includes PDP addresses and routing information, i.e. SGSN addresses for active GPRS subscribers. The GGSN updates the location directory using routing information supplied by the SGSNs. The GGSN uses the routing information for tunneling the protocol data units PDU from external networks to the current location of the UE, i.e. to the serving SGSN, in accordance with the GPRS tunneling protocol (GTP). Tunneling means that the data packet is encapsulated into another data packet during transfer from one end of the tunnel to another. The GGSN also decapsulates data packets received from UEs and forwards them to the appropriate data network. In order to send and receive GPRS data, the UE activates the packet data address that it wants to use, by requesting a PDP activation procedure. This operation makes the UE known in the corresponding GGSN, and interworking with external data networks can commence. More particularly, one or more PDP contexts are created and stored in the UE and the GGSN and the SGSN. The PDP context defines different data transmission parameters, such as PDP type (e.g. X.25 or IP), PDP address (e.g. IP address) and quality of service QoS.

In FIG. 3, a PMR-over-cellular (PMRoC) layer is provided on top of the mobile network in order to provide group communication services to the user equipments UE through the mobile network. Conceptually, the PMRoC layer comprises the media gateway MG (also called a PMRoC bridge) and a PMRoC call processing server (CPS) comprising the media gateway controller MGC. The CPS comprises also call control and signaling gateway functionalities. The MG and the MGC (CPS) are connected to the GGSN, typically over an IP network. The media gateway MG and the media gateway controller MGC run PMR applications which communicate with the PMR application(s) in the user equipment UE over the IP connections provided by the IP mobile RAN. This communication includes both signaling packets and group communication packets.

The CPS 11 is responsible for control-plane management of the PMR communications. Its important role may require various functionalities which can be implemented in the following modules: "PMR server"—the application that handles the sessions for group memberships which are signaled with an appropriate session control protocol, such as SIP, established for the PMRoC communications, and manages the users profiles (call rights, group active membership, scanning settings, etc.); SIP Proxy/Location Server—providing user location and routing functionalities of SIP signaling; SIP Registrar—for user registration/authentication; and the media gateway controller—controlling the network entities involved in the IP layer data distribution according to the group & user specific information (membership, rights, scanning settings, etc.).

Figure 4:
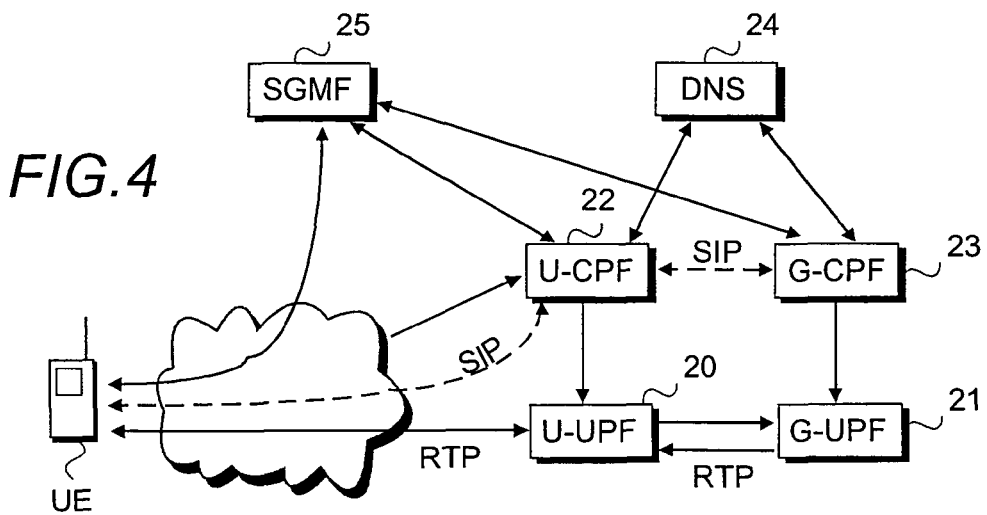
Figure 6:
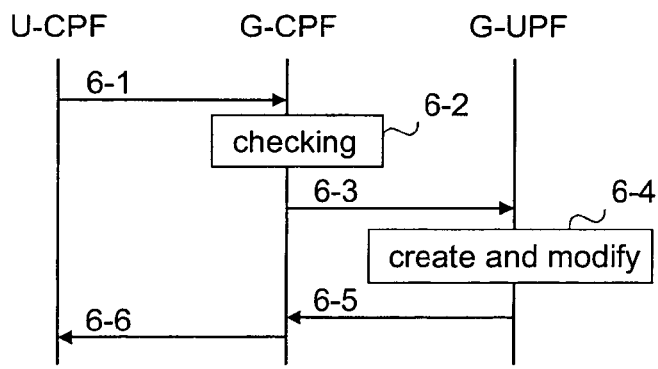
FIG. 6 illustrates modification of a group termination in the exemplary embodiment of the invention.

However, since the PMR management requirements can be divided into group and user specific ones, two kinds of media gateway controllers MGC, i.e. CPS servers, are defined in one embodiment of the invention, as illustrated in FIG. 4. The SIP sessions for group communications are handled by a Group Control Plane Function (G-CPF) 23 (e.g. in a server), the G-CPF comprising the media gateway controller for groups. When a user attaches to a group, the G-CPF 23 takes care of the relative SIP invitation transaction and performs the proper mapping settings between the user's recipient and the network entities responsible for the relative traffic distribution. The G-CPF initiates the creation of the GT and modifies the GT, when needed, as illustrated in FIG. 6. The User—Control Plane Function (U-CPF) 22 (e.g. a control plane proxy server) is basically the control plane interface between the IP network and the user. The U-CPF comprises the media gateway controller for individual users. By this network entity the users log on to the system and negotiate their operational settings (scanning settings, etc.). It handles the user's profile and manages his one-to-one calls. It should be appreciated that this is just a logical separation, and both kinds of MGCs can be situated in the same computer. Separating G-CPF and U-CPF enables users to join PMRoC groups handled by G-CPF in different Intranets or in mobile networks of different operators and IP domain. Division also brings scalability by allowing in practice infinite number of groups or users in the system.

Referring again to FIG. 3, the media gateway MG is responsible for the real-time distribution of VoIP packets to the users' terminals according to their group memberships, their scanning settings and eventual pre-emption or emergency cases. Each media gateway forwards traffic only between valid connections programmed by the MGC. The media gateway MG may perform one or more of the following functionalities:

Input checking: to identify and authenticate the traffic source. Input checking may also include actions to perform and support security procedures.

Input filtering: to manage that only one talker talks in a group at a time (i.e. grants a speech item), and optionally to give priority to higher priority voice items.

Multiplication: after the filtering process, the media gateway MG has to check the active members of the group to which the traffic is destined and generate from the incoming packet a "downlink" packet for each active member.

Scanning filtering: to select from the multiple incoming traffic streams destined to the same user the one which has to be forwarded to his recipient according to the user's scanning settings.

Again, since input filtering and multiplication are group specific processes, while input checking and scanning filtering are user specific, the following two kinds of media gateways, i.e. application bridges, have been defined in one embodiment of the invention, as illustrated in FIG. 4.

Figure 5:
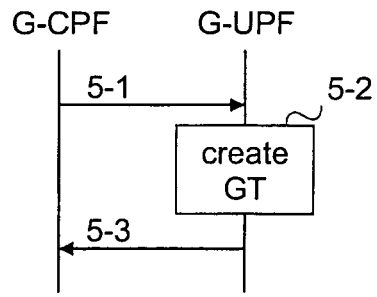
FIG. 5 illustrates a creation of a group termination in the exemplary embodiment of the invention.

Firstly, a Group—User Plane Function G-UPF 21 (e.g. in a server) is a network entity to which group members' media streams, such as audio packets are sent (through their U-UPF) and where the input filtering and multiplication processes are performed by the group termination(s) of the present invention. To each new group the G-CPF 23 assigns a single G-UPF 21 according to load balancing criteria which distributes the traffic as evenly as possible between the G-UPFs. During assignment a context comprising the group termination for that specific group may be generated, as illustrated in FIG. 5.

The User—User Plane Function U-UPF 20 (e.g. in a server) performs the input checking and scanning processes for the individual subscribers which have been assigned to it by the U-CPF 22. For security purposes the U-UPF 20 may have security associations for each mobile terminal it handles. The U-UPF 20 hides the network complexity from the mobile terminals, so the user has just to send all his user plane traffic to this unit that afterwards forwards it according to the mapping settings of the proper U-CPF 22. In this way there is no need to establish secure channels between each user and all the IP network entities which have just to trust the U-UPF 20 from which they receive packets.

As for the Control Plane elements, this logical splitting does not necessarily require a physical separation between the G-UPF and the U-UPF implementations, and thus they may be located in the same computer.

The U-CPF 22 and the G-CPF 23, which are responsible for managing the sessions of the users and the groups, respectively, require specific control plane signaling. ETSI 3GPP (European Telecommunications Standards Institute, 3rd Generation Partnership Project) specifications include IP based voice communications in a so called all-IP network. Such an all-IP network enables also voice communication in IP network (voice over IP, VoIP). For VoIP, call control signaling is specified. In the exemplary embodiment, the SIP has been chosen to support and manage the PMRoC call sessions. However, some other IP session protocol may be used instead. Further, the Megaco is used by the G-CPFs 23 and the U-CPF 22 to control the G-UPFs 21 and U-UPFs 20 involved in traffic distribution of the IP layer. Still further, the RTP has been chosen to handle the transfer, and QoS mechanisms are needed to handle the voice packet (VoIP) delivery.

The SIP protocol defines signaling messages for call control, user location and registration, and these have been used in the preferred embodiment of the PMRoC solution to handle the specific PMR communications and the relative participating users (establishment, joining and tear down of a call session, user's log on to PMRoC services, user's profile negotiation, etc).

For each PMRoC communication, a SIP session is established and managed by the CPS, i.e. the MGC handling it (G-CPF 23 and U-CPF 22 for group and one-to-one communications respectively). When a user wants to become an active member of a group, he has to join the corresponding session. For individual calls, the PMRoC U-CPFs maintain one session per user for all individual calls.

All the user's outgoing and incoming traffic has to go through the U-UPF 20 that has been assigned to the user by his U-CPF 22. In particular, in the uplink the user's traffic is checked by his U-UPF 20 and forwarded to the G-UPF 21 handling the group to which the traffic is destined or, in case of one-to-one communication, to the U-UPF 20 handling the called party.

In the downlink, the traffic is then distributed to the destination users' U-UPFs 20 (by packet multiplication in the G-UPF 21 by the group termination of the invention in the case of group communication) where the users' scanning and/or filtering processes are performed and from where the traffic is delivered to the recipients.

This PMRoC solution is access independent, which means that it can run on top of GSM, WCDMA, WLAN or equivalent technologies as long as these are able to support the always-on VoIP bearers. The IP layer's audio distribution uses standard VoIP mechanisms (such as the RTP), while specific Internet protocols or interfaces will be used to connect supplementary network entities, such as Subscriber and Group Management Function (SGMF) 25, a Domain Name Server (DNS) 24, WWW/WAP (World Wide Web/Wireless Application Protocol) and security management servers. Each network entity is obviously associated with at least one IP address by which the IP packets are transferred and routed, but the role of the network elements have also to be defined from the SIP's point of view. Each UE is a SIP User Agent (UA), and thus each one has a SIP address (URL) which normally is "username@hostname" where the hostname can be, but not necessarily is associated with the U-CPF 22 in which the UE has to register. This U-CPF 22 should act as a Registrar, Location and Proxy SIP server in order to allow the reachability of the UEs under its control and to support the SIP signaling routing. The G-UPFs 21 and U-UPFs 20, which are exclusively involved in the audio data distribution, do not have a role in the actual SIP mechanisms and the core network is simply seen as a single IP network link. However, the addressing details are not essential for the invention and thus need not be discussed in more detail here.

Additionally, an SGMF 25 is preferably provided in PMRoC system for management and information query/updating purposes. Via SGMF 25, operator or a normal user having management rights can create, delete and modify users and groups in PMRoC system. Also access rights related to users and groups can be created and modified. The information itself can be contained in a database, such as Structured Query Language (SQL) database or in a directory, such as Lightweight Directory Access Protocol (LDAP, defined in RFC2251) directory. These data repositories can be stand-alone or co-located with SGMF 25. This database or directory is the main data repository in PMRoC system. Normal users having management rights can access SGMF using a WWW/WAP interface. An important function of SGMF 25 is also processing requests coming from U-CPF 22 and G-CPF 23 and making database or directory fetches and updates according to the requests. However, it is irrelevant for the invention how the management and information query/updating are implemented.

SOAP or a similar protocol can be used in the interface between U-CPF 22 and SGMF 25 as well as in the interface between G-CPF 23 and SGMF 25.

The user equipment UE, or mobile station, has a PMRoC application on a user layer on top of the standard protocol stack used in the specific mobile communications system. The SIP and RTP employ the underlying TCP, UDP and IP protocols which further employ the physical layer resources, such as the radio resources. Additionally, a WAP stack may be employed to access the WAP pages on the group management server.

Group Communication and Group Management

Groups (also called talkgroups) provide the users with an easy and immediate multipoint way for voice communication. Each user can be allowed access to one or more groups. A typical case is that a mobile user is allowed access to all groups in his Virtual Private Network (VPN). The user can be actively attached to a subset of the available groups. For more professional use, forced joining and removal to/from groups is provided.

In the basic mode, the mobile user selects one group for communication. He will then hear all traffic in that group (unless he is engaged in an individual call) and can also talk in the group. The user can easily switch to another group.

Groups need to be created before they can be used for communication. Creating groups and defining their access rights belongs to what is called group management. However, the details of group management are irrelevant for the invention.

Group access rights are checked by the G-CPF 23 at the time when a group session for user equipment is started. Additional checks can be made at other times if deemed necessary to maintain security. A user communicates (listens and talks) in groups for which he has an active session. Sessions are set up and ended by SIP signaling. The session setup can be initiated both by the user or by an authorized third party (such as a dispatcher or an application). Session establishment by a third party is mainly relevant only in PMR use. Many users, especially in the non-PMR market are likely to dislike session establishment by a third party and may like to be able to prevent this. The sessions may also be forcibly ended by the G-CPF 23, e.g. in case of group deletion. However, details on how the group sessions are established, modified or ended are irrelevant for the invention and need not be discussed here.

Creation of Group Termination in PMRoC

Depending on the implementation and possibly also on the type of the group, the group termination may be created when a group is created, when a first subscriber subscribes the services provided by the group or when a first member joins the group, for example. Correspondingly, the group termination may be deleted in response to a group deletion, the last subscriber ending his subscription or a last member leaving the group.

FIG. 5 illustrates the creation of a group termination. The media gateway controller G-CPF sends a Megaco message 5-1 to the media gateway G-UPF. The Megaco message includes at least an add command to create a group termination GT for the group. The message 5-1 can be as follows, for example (parameters and their values are purely imaginary in all messages described here):

```
Message {
    Version = x
    IP6Address {
        address = G-UPF's address
        portNumber = 2944}
    Transaction = 10002
        contextID = $
            TerminationID = $
                MediaDescriptor {
                    LocalControlDescriptor {
                        reserveValue = NOT USED
                        reserveGroup = NOT USED
                        Group/GrURL = us
                        Group/GrType = 0x1
                        Group/GrPort = 012
                        GroupAttG/UserURL = me
                        GroupAttG/UserSSRC = 0}}}}}}
```

In this example (and in the following examples) it is assumed that the packages are used and the media gateway recognizes that this add command relates to the group termination on the basis of the parameters. However, in another embodiment it is possible that the add command contains indication or indications, such as a flag, on the basis of which the media gateway recognizes that the message relates to the group termination.

The group termination specific parameters of this message, defined in the package(s), are indicated by the words 'Group' and 'GroupAttG'. The latter relates to a group member. In this exemplary message the group termination specific parameters are URL of the group (GrURL), a type of the group type (GrType), a group port number (GrPort), which is preferably the same as local port number in a termination for the group in the corresponding context of the active member in the U-UPF (see FIG. 7 for different terminations). Parameters relating to the first active member are URL of the user attaching to the group (UserURL) and an SSRC value for the user (UserSSRC). These parameters are not included in add commands with which a group termination is created although no active member has been attached to the group. The only necessary parameter is a parameter identifying the group, i.e. in this example the URL of the group.

When creating the group termination, the media gateway controller G-CPF also asks for a termination identifier value for the GT (TerminationID) and a context identifier value (Context id) by using the standard Megaco wildcard mechanism. The wildcard in Megaco is $. Other parameters in the message (and in the add command) are standard Megaco parameters or based on standard Megaco parameters and thus need not be explained here.

The media gateway G-UPF receives the message and creates in point 5-2 the context and the group termination and in this case also the user termination to the same context. Then the media gateway sends a reply message 5-3 to the media gateway controller G-CPF. The message 5-3 can be as follows:

```
Message {
    Version = x
    IP6Address {
        address = G-CPF's address
        portNumber = 2944}
    Reply = 10002{
        contextID = A4444{
            TerminationID = GT1 {
                AuditReturnParameter/MediaDescriptor {
                    LocalControlDescriptor {
                        Group/GrPort = 012
                        GroupAttG/UserSSRC = 0}}}}}}
```

Modification of Group Termination in PMRoC

The group termination is modified in response to a change in the group. The change in the group takes place when the user either becomes an active member of the group or leaves the group, for example. Another example is the modification of the group properties.

FIG. 6 illustrates how the group termination is modified when a member is added to a group. The U-CPF receives a message indicating that a user wants to become an active member of the group for which the group termination was created in FIG. 5. The U-CPF transfers this information in message 6-1 to the media gateway controller G-CPF. The media gateway controller may perform at point 6-2 security and access checking and, if the user is allowed to be a member of the group, sends message 6-3 to the corresponding G-UPF. The message 6-3 can be as follows (the parameters and their values are purely imaginary):

```
Message {
    Version = x
    IP6Address {
        address = G-UPF's address
        portNumber = 2944}
    Transaction = 10003 {
        contextID = A4444 {
            Modify {
                TerminationID = GT1
                MediaDescriptor {
                    LocalControlDescriptor {
                        reserveValue = NOT USED
                        reserveGroup = NOT USED
                        GroupAttG/UserURL = friend
                        GroupAttG/UserSSRC = 6}}}}}}}
```

The modify command identifies the group context to which a new member is to be added and has parameters needed for the new member. (Parameters are described in FIG. 5.)

The media gateway G-UPF receives the message 6-3 and creates at point 64 the user termination and modifies the group termination. Then the media gateway sends a reply message 6-5 to the media gateway controller G-CPF. The acknowledgment message may be similar to above message 5-3 in FIG. 5 when the modification was successful. As stated earlier, the parameters in the Modify command depends on what is modified and thus the parameters in the GT are not limited to the ones described herein.

The signaling messages and points in FIGS. 4 and 5 are not in an absolute chronological order. Some of the signaling messages can be transmitted in a different order. Other signaling messages can also be transmitted, and/or other functions can be performed also between the messages. Correspondingly, some of the messages shown may also be left out. The signaling messages are only examples and they may comprise several independent messages for transferring the same information. In addition, the messages may also comprise other information or less information than what is disclosed in the examples.

Media Stream Distribution at User Plane

In the user plane the audio data real-time distribution to/from the end users is handled, and the media gateway 10 (the G-UPF 21 and the U-UPF 20 of FIG. 4) is the network element responsible for that. When multiple media gateways are involved in the same PMRoC communication, their work is controlled and coordinated by the media gateway controller, i.e. CPS 11 (the G-CPF 23 or U-CPF 22 of FIG. 4) that is handling the corresponding SIP session.

To provide a PMRoC solution, which is scalable to millions of users and at least hundreds of thousands of groups a specific addressing model is disclosed in the above-mentioned U.S. patent application Ser. No. 09/835,867. The principal aim of that model is to implement the complex mapping between the bridges, the users and their traffics using the strictly needed amount of IP addresses and port numbers and preferring static allocations (where possible) in order to reduce the amount of information to be exchanged between the network entities. The basic principles of the addressing model are discussed below. However, it is irrelevant for the invention, how the addressing is handled.

When a user (i.e. a member) speaks to a group, the user's UE sends the audio packets to his U-UPF which after the input checking forwards it to the group's G-UPF. The traffic forwarded by the U-UPF is uniquely identified by the IP address of the G-UPF and the port number the G-UPF has associated with the group, while the traffic between the user and his U-UPF is identified by the IP address of the U-UPF and the port number the U-UPF has associated with the group, so the UE can use the same socket to send and receive traffics from any groups.

When a user becomes an active member of a group he gets from his U-CPF the port number assigned by his U-UPF to the group's traffic. And at the same time the U-CPF and the G-CPF set the proper mappings between the user's U-UPF and the group's G-UPF. More specifically, the U-UPF gets the port number that the G-UPF has assigned to the group's traffic.

With the "split media gateway" model described above it may happen that in the downlink a G-UPF has to forward the incoming group traffic to separated U-UPFs. For that kind of communications, as well as for communications from a U-UPF to G-UPF, port numbers assigned for each group are used.

Figure 7:
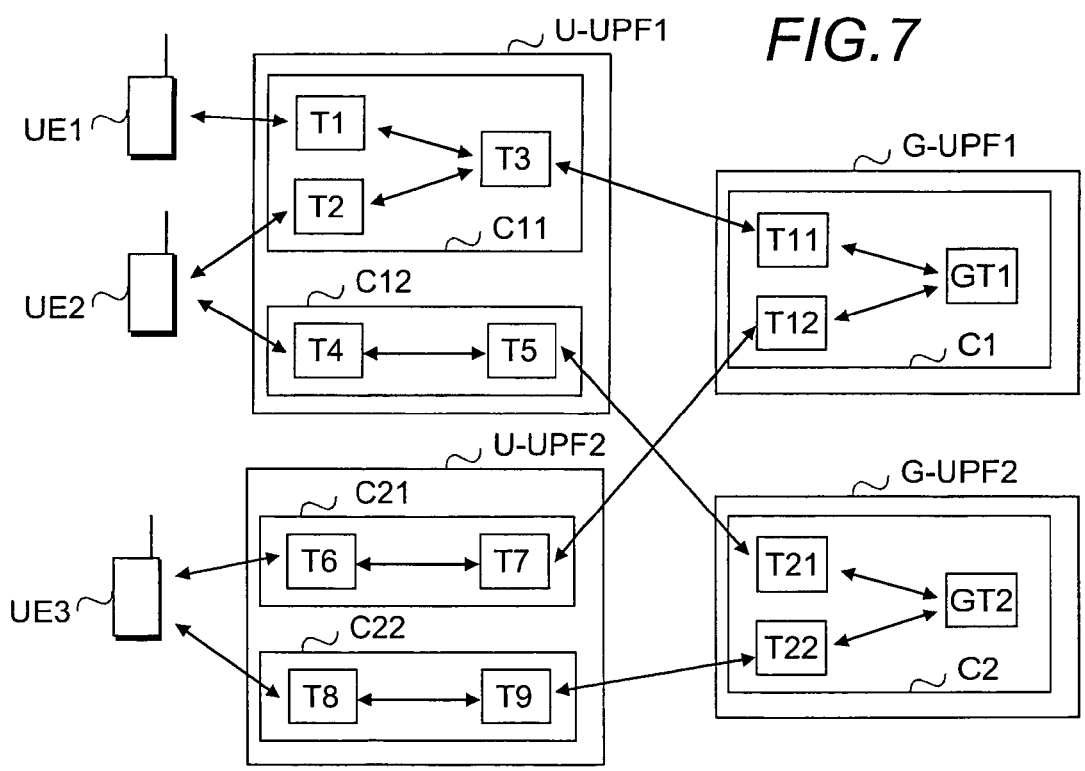
FIG. 7 is a block diagram illustrating that there can be several semi-duplex group session contexts for different groups.

In order to better describe how group calls are managed on the user plane, an example will now be illustrated. The current group's speaker sends his audio packet to his U-UPF that checks the packet and forwards it to the group's G-UPF where it will be processed by the group termination of the group. If the traffic passes the group termination, it is delivered to the U-UPFs involved, which will then serve their own active members. FIG. 7 shows one example how different U-UPFs can be involved.

FIG. 7 is a block diagram illustrating that there can be several semi-duplex group session contexts for different groups and that the group termination does not limit the number of members in a group. More precisely, it is an example of two group communications where the groups are in different media gateways and the members of the groups are served by different media gateways.

In the example of FIG. 7, the U-UPF1 has been assigned to the user equipments UE1 and UE2. The U-UPF 2 has been assigned to the user equipment UE3. The UE1 belongs to a group 1, the UE2 belongs to groups 1 and 2, and the UE3 belongs to groups 1 and 2. The G-UPF1 has been assigned to the group 1 and the G-UPF2 has been assigned to the group 2.

The G-UPF1 comprises a context c1 for the group 1, the context comprising a group termination GT1 for the group 1 and prior art terminations T11 and T12 via which the media streams are logically transferred between G-UPF1 and U-UPFs serving members of the group 1, i.e. U-UPF1 and U-UPF2 in FIG. 7.

Correspondingly, the G-UPF2 comprises context c2 for the group 2, the context c2 comprising a group termination GT2 for the group 2 and prior art terminations T21 and T22 via which the media streams are logically transferred between G-UPF1 and U-UPFs serving members of the group 2.

The U-UPF1 comprises context c11 for those members of the group 1 to which the U-UPF1 has been assigned and context c12 for those members of the group 2 to which the U-UPF1 has been assigned. Both contexts comprise prior art terminations. The context c11 comprises a termination T1 for the user equipment UE1, a termination T2 for the user equipment UE2 and a termination T3 via which the media stream is logically transferred between the context c11 and the G-UPF of the group 1. The context c12 comprises a termination T4 for the user equipment UE2 and a termination T5 via which the media stream is logically transferred between the context c12 and the G-UPF of the group 2.

Correspondingly, the U-UPF2 comprises context c21 for those members of the group 1 to which the U-UPF2 has been assigned and context c22 for those members of the group 2 to which the U-UPF2 has been assigned. Both contexts comprise prior art terminations. The context c21 comprises a termination T6 for the user equipment UE3 and a termination T7 via which the media stream is logically transferred between the context c21 and the G-UPF of the group 1. The context c22 comprises a termination T8 for the user equipment UE3 and a termination T9 via which the media stream is logically transferred between the context c22 and the G-UPF of the group 2.

In another embodiment of the invention the context c1 in the G-UPF1 comprises a prior art termination for each member of the group, i.e. two terminations instead of the common termination T11 in FIG. 7. In the embodiment the context c11 in the U-UPF1 is either split into parts (so that each member will have a context of his own for the group 1), or comprises two terminations instead of termination T3.

One media gateway controller may control both the G-UPF1 and the G-UPF2 (and the U-UPF1 and the U-UPF2) or different media gateway controllers may control them.

Although the invention has been described above with the PMRoC system it is obvious for one skilled in the art that the invention can be implemented with every system utilizing the Megaco protocol.

The above embodiments of the invention are only examples, and in order to have new embodiments according to the invention the features described in the embodiments can be combined in a different manner than what is described above.

It will be obvious to a person skilled in the art that, as the technology advances, the inventive concept can be implemented in various ways. The invention and its embodiments are not limited to the examples described above but may vary within the scope of the claims.

What is claimed is:

1. A method comprising:
    transferring group-related information of a group from a media gateway controller to a media gateway to which media streams targeted at members of the group are transferred in a telecommunications system, the transferring group-related information occurring at least by:
        creating, in the media gateway, a group termination for the group-related information, the group termination being non-member-specific and associated with the group, the group being any logical group of three or more users intended to participate in a same group communication, the group termination being a logical entity that sources or sinks or sources and sinks a plurality of media streams corresponding to the group communication;
        directing the media streams for the group to the group termination;
        applying, at the group termination, at least one rule with at least one parameter with its value to the plurality of media streams to determine at a particular time which user may transmit and which users may receive corresponding media streams;
        receiving, in the media gateway, the at least one parameter with its value as group-related information;
        storing the at least one parameter and its value to the group termination; and
        applying the stored at least one parameter according to its value to the media streams directed to the members of the group.

2. The method of claim 1, wherein the at least one parameter relates to which one of the members is allowed to speak.

3. The method of claim 2, further comprising:
    discarding, in the group termination, media streams originated from members not allowed to speak; and
    forwarding a media stream originated from a member allowed to speak to other members of the group.

4. The method of claim 3, wherein receiving further comprises receiving in the media gateway and storing in the group termination at least one multiplication parameter with its value, the multiplication parameter relating to multiplying media streams targeted at the members.

5. The method of claim 2, wherein receiving further comprises receiving in the media gateway and storing in the group termination at least one assignment parameter with its value, the parameter relating to assignment of speaking turns.

6. The method of claim 1, wherein the at least one parameter relates to multiplying media streams targeted at the members.

7. The method of claim 1, wherein the at least one parameter relates to adding inband information.

8. The method of claim 1, wherein the group termination is created in response to a first active member joining the group.

9. The method of claim 1, wherein the group termination is created in response to a first active member joining the group and maintained as long as there is at least one active member in the group.

10. The method of claim 1, wherein the group termination is created in response to creation of the group.

11. The method of claim 1, further comprising modifying the group termination by adding, subtracting or modifying information in the group termination.

12. A network node comprising:
    a media gateway configured to transfer group-related information of a group from a media gateway controller to the media gateway to which media streams targeted at members of the group are transferred in a telecommunications system, the transferring group-related information occurring at least by the media gateway being configured:
        to create a group termination in response to an add command received from the media gateway controller, the group termination for the group-related information and being non-member-specific and associated with the group, the group being any logical group of three or more users intended to participate in a same group communication, the group termination being a logical entity that sources or sinks or sources and sinks a plurality of media streams corresponding to the group communication;
        to direct all media streams for the group to the group termination;
        to apply, at the group termination, at least one rule with at least one parameter with its value to the plurality of media streams to determine at a particular time which user may transmit and which users may receive corresponding media streams;
        to receive the at least one parameter with its value as group-related information;
        to store the at least one parameter and its value to the group termination; and
        to apply the stored at least one parameter according to its value to the media streams directed to the members of the group.

13. The network node of claim 12, further comprising a media gateway controller, and wherein the media gateway controller controls the media gateway using at least a Megaco protocol, and the media gateway is further configured to add to the group termination at least one multiplication parameter, the multiplication parameter indicating to which members of the group a media stream is to be multiplied, and to multiply the media stream, if the media stream is forwarded.

14. The network node of claim 12, wherein the at least one parameter relates to which one of the members is allowed to speak.

15. The network node of claim 14, wherein the media gateway is further configured:
   to discard, in the group termination, media streams originated from members not allowed to speak; and
   to forward a media stream originated from a member allowed to speak to other members of the group.

16. The network node of claim 15, wherein the media gateway is further configured, when receiving, to receive in the media gateway and store in the group termination at least one multiplication parameter with its value, the multiplication parameter relating to multiplying media streams targeted at the members.

17. The network node of claim 14, wherein the media gateway is further configured, when receiving, to receive in the media gateway and store in the group termination at least one assignment parameter with its value, the parameter relating to assignment of speaking turns.

18. The network node of claim 12, wherein the at least one parameter relates to multiplying media streams targeted at the members.

19. The network node of claim 12, wherein the at least one parameter relates to adding inband information.

20. The network node of claim 12, wherein the group termination is created in response to a first active member joining the group.

21. The network node of claim 12, wherein the group termination is created in response to a first active member joining the group and maintained as long as there is at least one active member in the group.

22. The network node of claim 12, wherein the group termination is created in response to creation of the group.

23. The network node of claim 12 further comprising modifying the group termination by adding, subtracting or modifying information in the group termination.

* * * * *